United States Patent [19]

Vander Heyden

[11] Patent Number: 4,633,719

[45] Date of Patent: Jan. 6, 1987

[54] DIGITAL FLOW METER CIRCUIT AND METHOD FOR MEASURING FLOW

[75] Inventor: William H. Vander Heyden, Mequon, Wis.

[73] Assignee: Badger Meter, Inc., Milwaukee, Wis.

[21] Appl. No.: 716,471

[22] Filed: Mar. 27, 1985

[51] Int. Cl.$^4$ .................................................. G01F 1/66
[52] U.S. Cl. .................................................. 73/861.28
[58] Field of Search ........................ 73/861.27, 861.28; 364/510

[56] References Cited

U.S. PATENT DOCUMENTS 3,835,704  9/1974  Elazar et al. ..................... 73/861.28
3,935,735  2/1976  Lee .
4,052,896  10/1977  Lee et al. .

OTHER PUBLICATIONS

Badger Meter, Inc., Dwg. SD-151635, Feb. 27, 1980 (2 sheets).

Primary Examiner—Herbert Goldstein
Attorney, Agent, or Firm—Quarles & Brady

[57] ABSTRACT

In a method and apparatus for generating a signal proportional to flow in a pipe using probes strapped onto the exterior of the pipe, two ultrasonic pulse trains at a carrier frequency are sent in opposite directions from one probe to the other. Two lower frequency signals are extracted from the two respective pulse trains and analyzed to detect a phase difference. The phase difference corresponds to a difference in the travel times for the two pulse trains caused by the flow velocity in the pipe. The two lower frequency signals are converted to digital data samples which are stored with reference timing data. A microelectronic processor synchronizes the two sampled waves, using the timing data, before comparing the sampled waves to determine the phase difference. The processor and associated circuitry also measure the travel times of the two ultrasonic pulse trains and generate an output signal proportional to flow based on the measured phase difference and the measured travel times.

9 Claims, 8 Drawing Figures

Microfiche Appendix Included
(55 Microfiche, 1 Pages)

DIGITAL FLOW METER CIRCUIT AND METHOD FOR MEASURING FLOW

Microfiche Appendix B with 1 microfiche of 55 frames is incorporated herein.

BACKGROUND OF THE INVENTION

1. Field of the Invention

The invention relates generally to instruments for measuring fluid flow through a pipe or conduit, and more particularly to those meters which utilize ultrasonic signals for measuring flow rate.

2. Description of the Prior Art

A basic ultrasonic flow meter is shown and described in Lee, U.S. Pat. No. 3,935,735, issued Feb. 3, 1976, and assigned to the assignee of the present invention. This meter uses a pair of transducers mounted on opposite sides of a diametrical section of a pipe, with one of the transducers being positioned downstream from the other. This sets up a diagonal ultrasound path from one transducer to the other. Each transducer is both a transmitter and a receiver of an ultrasonic pulse train. In transmission, electrical signals are converted by the transducers to sound waves, while in reception, the transducers convert sound waves to electrical signals. Two pulse trains are transmitted simultaneously at opposite ends of the ultrasound path and are received a short time later at their opposite destinations.

The electrical signals that are used in generating the ultrasonic waves are generated at a relatively higher carrier frequency signal $f_C$. A relatively lower frequency signal $f_D$ can be extracted from the carrier signal by signal mixing techniques. The ultrasonic pulse train is generated as a number of cycles of the higher frequency signal $f_C$ for at least one period of the desired, lower frequency signal $f_D$. The lower frequency signal is obtained by mixing the carrier signal of frequency $f_C$ with a comparable high frequency signal of frequency $f_C + f_D$. When the two higher frequency signals are mixed, they produce an even higher frequency signal $f_{2C+D}$ representing the sum of the signals that are mixed and a lower frequency signal $f_D$ that represents the difference between the signals that are mixed. The latter is referred to as a signal at the "difference frequency."

The ultrasonic pulse train at the carrier frequency $f_C$ travels across the flow stream at approximately the speed of sound through the particular flow medium. Depending on the flow velocity of the medium in the direction of the pipe axis, the travel time will be shortened slightly for travel in a downstream direction and the travel time will be lengthened slightly for travel in an upstream direction. For pipes of small diameter, the total travel time for the ultrasonic wave is very short. The measurement of small changes in travel time of the ultrasonic wave is a basic technical problem in metering flow rate.

As further explained in the Lee patent, a mathematical relationship has been developed in which the flow rate is expressed as a function of the elapsed travel times for the two ultrasonic pulse trains, and further as a function of the difference between the travel times in the upstream and downstream directions, respectively. The flow rate (V') can be expressed in terms of some constant (k), the difference between the two travel times ($T_{12}-T_{21}$) and the two travel times ($T_{12}$ and $T_{21}$) as follows:

$$V = k \frac{(T_{12} - T_{21})}{(T_{12})(T_{21})} \quad (1)$$

In a pipe with a diameter of one foot, and a medium in which the speed of a sonic wave is 5000 feet/second when the full-scale fluid flow is 2.5 feet/second, the difference between the two travel times $T_{12}$ and $T_{21}$ is 0.2 microseconds ($0.2 \times 10^{-6}$ seconds). For an accuracy of 1% of full scale, a difference in travel times as short as 2 nanoseconds ($2 \times 10^{-9}$ seconds) must be detected.

The Lee patent further discloses that the difference in the two travel times can be measured by detecting the difference in phase of the two lower frequency signals $f_{D12}$ and $f_{D<}$ which can be extracted from the ultrasonic pulse trains. When the oppositely directed pulse trains are received they are conducted through separate receiving channels, where they are electrically mixed with other signals as described above to obtain the sum and difference frequencies. The difference frequency signals are then extracted using low pass filters. The two resulting difference frequency signals are fed to a zero-crossing detector, which produces an output pulse having a pulse width proportional to the phase angle difference between the two zero-crossing points. This signal is then transmitted to a calculating unit which transforms the pulse width to a time difference and performs a calculation according to equation (1) above to obtain a signal proportional to flow rate.

Following the work represented by the Lee patent there was another device which improved the resolution of the velocity measurement using a multiple-path filter network to analyze the phase shift of the difference frequency signals that were extracted from the ultrasonic pulse trains. In this device each of the two extracted signals was sampled at eight intervals. The samples were taken as analog signals that were stored in banks of switched capacitor circuits. The storage of analog signals was timed with a clock signal from the transmitter.

The availability of microelectronic processors provides an opportunity for greater resolution of phase differences using Fourier mathematical methods. As fast as these circuits are, they are not fast enough to sense either the carrier frequency signals or the difference frequency signals "on the fly" and perform the other calculating and processing tasks assigned to them. There are several issues presented in the handling of the ultrasonic signals on the receiving side. These include (1) how to capture the reception signal for processing (2) how to assure synchronization of two reception signals when the circuitry for detecting these signals responds differently in detecting the two signals, (3) how to measure elapsed travel times for the ultrasonic pulse trains and (4) how to implement Fourier analysis of the sampled wave forms.

SUMMARY OF THE INVENTION

The invention is incorporated in one specific type of flow meter circuit claimed herein, and is also practiced more generally in various other flow meters which utilize the general method of the invention.

The general method is characterized by the digital sampling of the two ultrasonic pulse trains, and by the data referred to as timing marks, which are associated with the sampling data for each respective pulse train. The timing marks are used as a reference to synchronize the sampled data before determining a phase difference between the two signals. This method is valuable when using a microelectronic processor as a unit for calculating flow rate because it provides a method for storing data at a high sampling rate for later processing.

The invention is more particularly embodied in a signal processing circuit for a flow meter. This circuit includes a signal generator for generating two ultrasonic pulse trains that are transmitted across the flow stream from probes at opposing points, and a signal receiver for receiving the two pulse trains. The circuit also includes a first timing subcircuit for generating elapsed time signals that mark the time from transmission to receipt of each ultrasonic signal. Other circuitry is coupled to the signal receiver to generate and store digital sampling data corresponding to each of the two ultrasonic reception signals. A second timing subcircuit is coupled to the signal generator and to the sampling circuitry to generate the timing marks that are associated with the sampling data. Lastly, the signal processing circuit includes a digital processing circuit, which may be a microelectronic computer, and this circuit reads the elapsed time signals from the first timing subcircuit and also reads the digital sampling data and associated timing marks from the second timing subcircuit. With this data the digital processing circuit then calculates flow rate and generates a proportional output signal which is used in indicating flow rate on some type of visual display on the meter.

One object of the invention is to provide a flow meter which can be used with sensors strapped on the exterior of a pipe. While the invention enhances the flow meter by permitting its use with strap-on sensors, the invention can also be used with sensors that penetrate the pipe wall.

Another object of the invention is to provide such a flow meter for pipes as small as two inches in diameter.

Another object of the invention is to provide a microprocessor-based signal processing circuit that can resolve phase differences on the order of ±0.01° out of 360°.

Another object of the invention is to provide a high speed digital sampling circuit which can store at least one wavelength of a phase-shifted signal and store it with timing data for later processing by a microelectronic processor.

Another object of the invention is to measure short differences in signal travel times which are present in transmission-type flow meters with a circuit that is very sensitive, but is independent of drift in circuit components.

Another object of the invention is to enable detection of small differences in signal travel times with a method and a circuit that do not rely on timing stability of signal receiver and detector components.

Another object of the invention is to provide a digital circuit for controlling and measuring the times of transmission and reception of the ultrasonic signals transmitted through the pipe and the flow stream.

These and other objects and advantages of the invention will become apparent from the following description and from the drawings and appendices, which form a part hereof and which are referred to in the description. These disclose a preferred embodiment—which is but one example of the invention. For the range of devices coming within the legal scope hereof, reference is made to the claims which follow the description.

DETAILED DESCRIPTION OF THE PREFERRED EMBODIMENT

Figure 1:
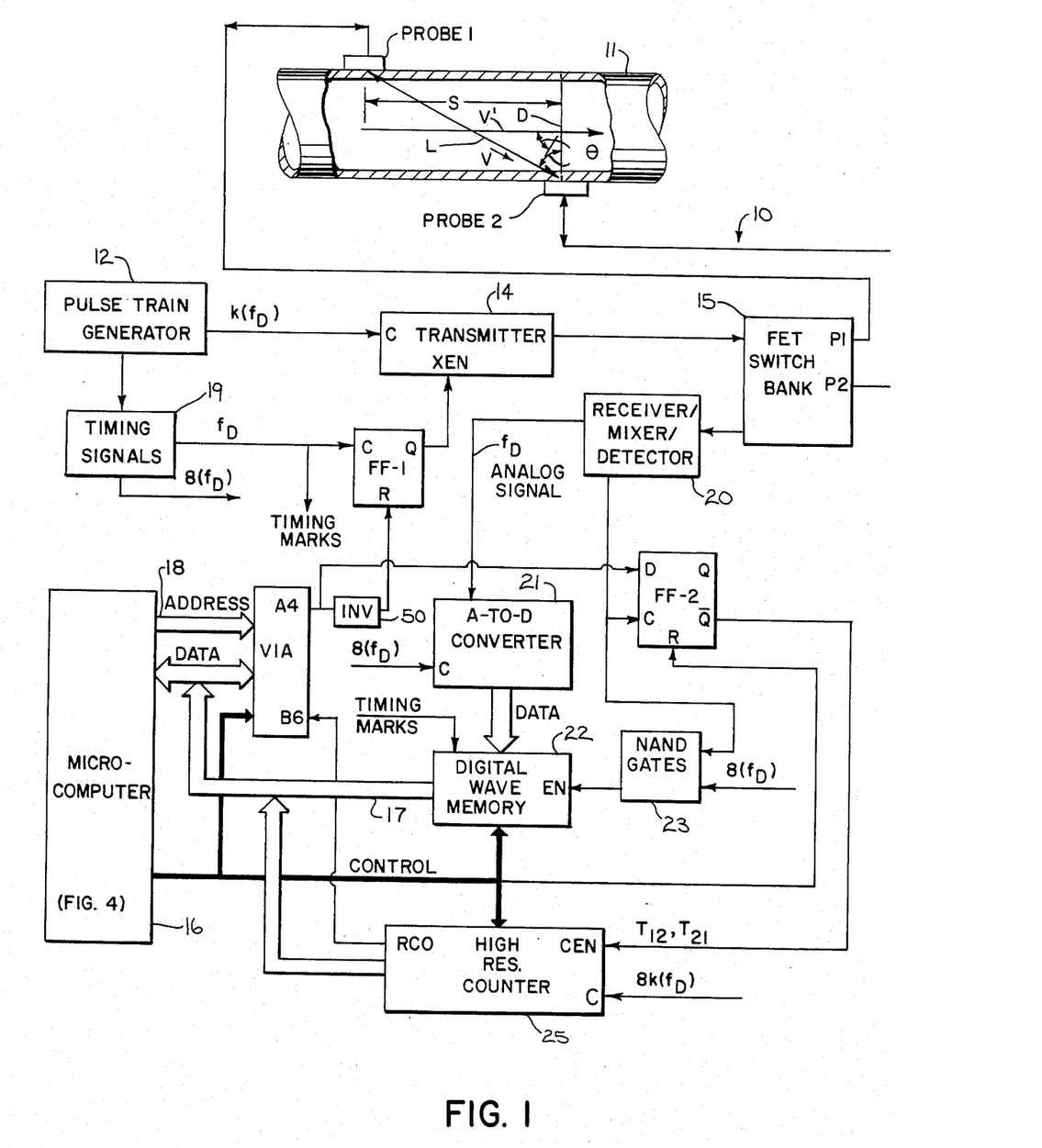
FIG. 1 is a block diagram of a flow meter signal processing circuit that incorporates the present invention.

The invention is incorporated in a signal processing circuit 10 for an ultrasonic flow meter as illustrated in FIG. 1. The flow meter in this example is of the type that can be mounted or "strapped on" the exterior of a longitudinal section of pipe 11, although the invention can also be employed with sensors that penetrate the pipe wall. The flow meter also includes a pair of transducers, referred to as PROBE 1 and PROBE 2, positioned halfway around the pipe 11 from each other and on opposite sides of a diametrical section of the pipe 11. The probes are therefore spaced apart by the outer diameter D of the pipe 11. PROBE 1 is located upstream and PROBE 2 is located downstream by a distance S measured longitudinally along the pipe 11.

A fluid is flowing through the pipe 11 with a velocity V' along the longitudinal axis of the pipe 11. Each of the transducers is both a transmitter and a receiver of ultrasonic waves that travel between PROBE 1 and PROBE 2 at a velocity V along a diagonal path of length L. The angle between diameter D and the path L has been designated $\theta$, and a sonic pulse train traveling from PROBE 1 to PROBE 2 travels at the speed of sound in the particular medium, that speed being designated c, pulse the component of axial flow velocity taken along the signal path ($c + V' \sin\theta$). A sonic wave traveling in the opposite direction, from PROBE 2 to PROBE 1, travels at ($c - V' \sin\theta$). The time of travel can then be expressed as the length of the path L divided by the speed of travel in each respective direction to provide the following two equations:

$$T_{12} = \frac{L}{c + V' \sin\theta} \quad T_{21} = \frac{L}{c - V' \sin\theta} \quad \text{(2 and 3)}$$

The travel times $T_{12}$ and $T_{21}$ have been developed with reference to travel through the medium. If the travel times are expanded to include the time from transmission of an electrical signal to one of the probes to the time of reception of an electrical signal from one of the probes by a signal receiver, certain delay factors are algebraically summed with equations (2) and (3) to arrive at the total travel time.

As explained in Lee, U.S. Pat. No. 3,935,735, issued Feb. 3, 1976, the average flow velocity in axial direction, V', can be expressed in terms of these travel times, and independent of the velocity c, in the following manner:

$$V = \frac{K(L)(T_{21} - T_{12})}{(T_{12})(T_{21})} \quad (4)$$

where K is a constant.

In this equation the delay factors have cancelled in the numerator on the assumption that they are of equal magnitude in either direction of travel. The delay factors would still be present in the denominator, but they will not be considered here, as they are not required for an understanding of the present invention.

The difference in travel time is further related to a phase shift in the ultrasonic waveform. The mathematical expression for an ideal voltage transmission signal V(t) coupled to one of the probes is as follows:

$$V(t) = V_o[G(t)] \sin \omega t \quad (5)$$

where $V_o$ is a constant and a scale factor for the voltage, and where G(t) is a gate function that defines the length of the transmission from the time the transmitter is turned on until it is turned off. The term "ωt" in the sine function represents an angular wave velocity ω, which is multiplied by a time "t" to arrive at an angle Φ for which the sine function can be evaluated. If $T_o$ is designated as the travel time (in the direction from PROBE 1 to PROBE 2) at zero flow, and $T_{12}$ is designated as the travel time at some non-zero flow, then the voltage signal on the receiving end can be rewritten for zero flow as follows:

$$V(t) = V_o[G(t)] \sin \omega T_o \quad (6)$$

and for the non-zero flow as:

$$V(t) = V_o[G(t)] \sin \omega T_{12} \quad (7)$$

Since $T_{12}$ is less than $T_o$ by an amount $\Delta t_{12}$, equation (7) can be rewritten as:

$$V(t) = V_o[G(t)] \sin (\omega T_o - \omega \Delta t_{12}) \quad (8)$$

where $\omega T_o$ is equal to some reference angle $\Phi_o$ and where $-\omega \Delta t_{12}$ is equal to some change in phase angle $-\Delta\Phi$.

Also, the angular velocity of the wave (ω) is equal to $2\pi f_C$, where $f_C$ is the frequency of the carrier wave. The angular velocity is therefore also equal to $2\pi k f_D$, where k is a constant. Because the frequency (f) of the wave remains the same during travel through the medium, so does the term ω. The difference in travel time therefore corresponds to the change in the phase angle. As explained in the Background of the Invention, due to the small increment of change in travel time that is being measured, it has proved more practical to measure the change in phase angle that corresponds to this change in travel time.

The above analysis can also be applied to a wave traveling in the opposite direction—from PROBE 2 to PROBE 1—except that the change in phase angle will have an opposite sign (+ΔΦ) relative to the phase at zero flow.

If the difference is taken between the phase angle $\Phi_{12}$ corresponding to $T_{12}$ and the phase angle $\Phi_{21}$ corresponding to $T_{21}$, and a constant is factored out to proportion the phase angle to the travel time, equation (4) can be rewritten as follows:

$$V = K' \frac{(\Phi_{21} - \Phi_{12})}{(T_{12})(T_{21})} \quad (9)$$

where K' is a combination of various constants.

To make the detection of phase changes less difficult, it is preferred that these changes be detected with reference to the difference frequency, $f_D$, which exhibits the same phase change as the carrier $f_C$, but which is lower in frequency by a factor k, which in this example is 13.47. In other embodiments using this signal mixing technique, the number k might be as high as fifty, for example. The difference frequency signal is obtained on the receiving end of each transmission by a signal mixing process to be described below.

Figure 2:
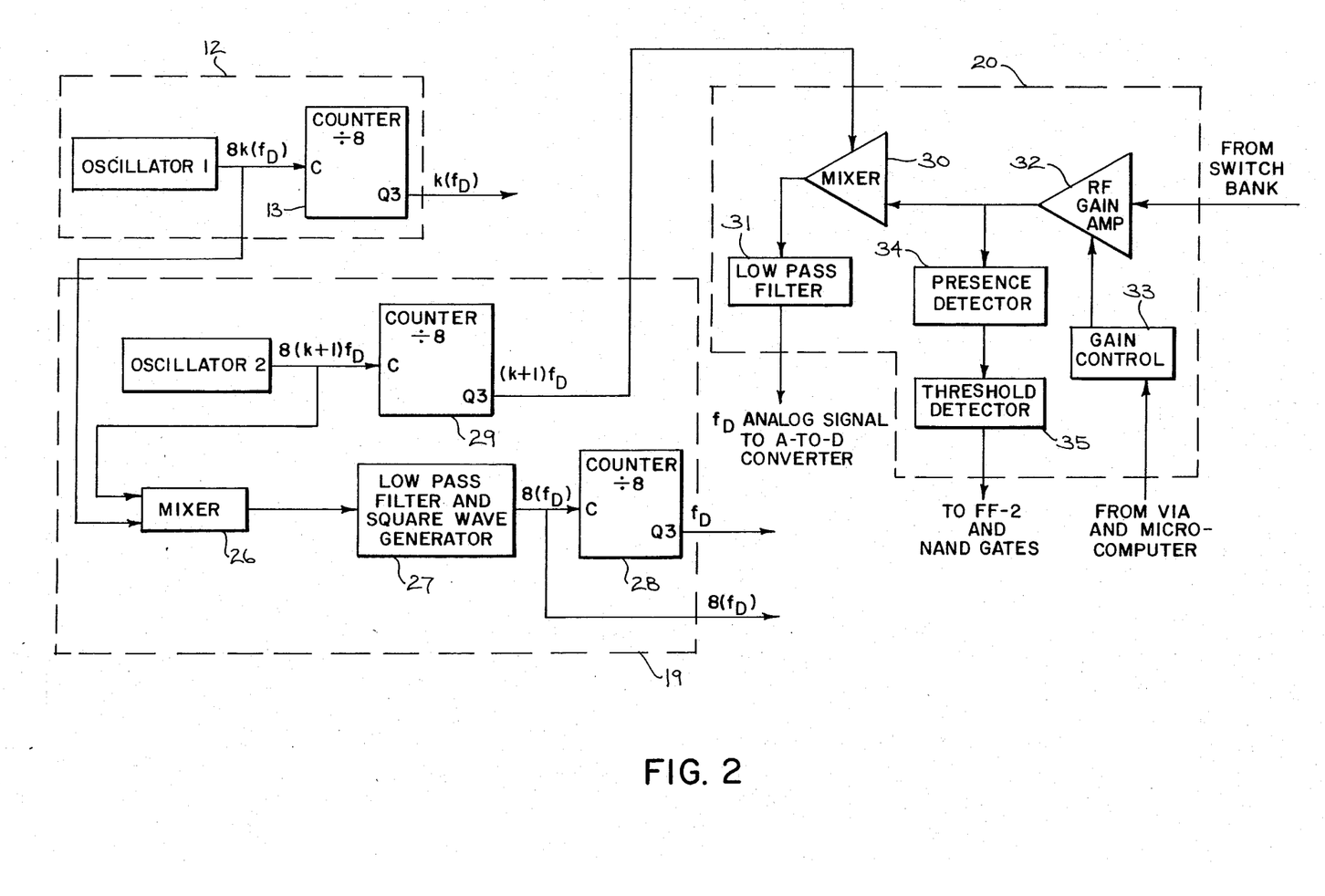
FIG. 2 is a more detailed block diagram of several circuits shown in FIG. 1.

The signal processing circuit 10 of FIG. 1 includes a pulse train generator 12 that generates a digital signal at a frequency $k(f_D)$ or 1.28 MHz. As seen in FIG. 2 the generator 12 of FIG. 1 includes an OSCILLATOR 1 circuit and a counter 13. The OSCILLATOR 1 circuit is a crystal oscillator that generates clock pulses at a rate of $8k(f_D)$ or 10.24 MHz to the clock input (C) on the counter 13. The counter 13 produces a 1.28-MHz signal at its Q3 output to divide the 10.24 MHz signal by eight.

Returning to FIG. 1, the output from the generator 12 is sent to a clock input (C) on a transmitter 14 that is essentially a gated power amplifier. The transmitter 14 generates a generally sinusoidal wave (XMIT in FIG. 5) at the frequency of the clock signal for a period in which the transmitter 14 is enabled at its XEN input. This provides a train of pulses at the carrier frequency, and this signal burst is routed to either PROBE 1 or PROBE 2 through an FET (field effect transistor) switch bank 15 having P1 and P2 outputs connected to PROBE 1 and PROBE 2, respectively.

The transmitter 14 is turned on and off by a microcomputer 16 which is the primary controlling element in the circuit 10. The microcomputer 16 sends data over a data bus 17 to control registers in a VIA (Versatile Interface Adapter). Specific control registers in the VIA are addressed through an address bus 18. When the microcomputer 16 outputs "10" (hex) to the "port A" register in the VIA, a signal is coupled from the A4 output on the VIA to a reset (R) input on a D-type flip-flop FF-1. The D and S inputs are not shown, but the D input is pulled to a logic high state and the S input is pulled to ground to allow the flip-flop FF-1 to be controlled at its reset input. The logic high signal from the A4 output is changed to a logic low signal by an inverter 50 in the line going to the reset input on the flip-flop FF-1. This logic low signal removes the reset and allows the flip-flop FF-1 to respond to clock signals.

Figure 5:
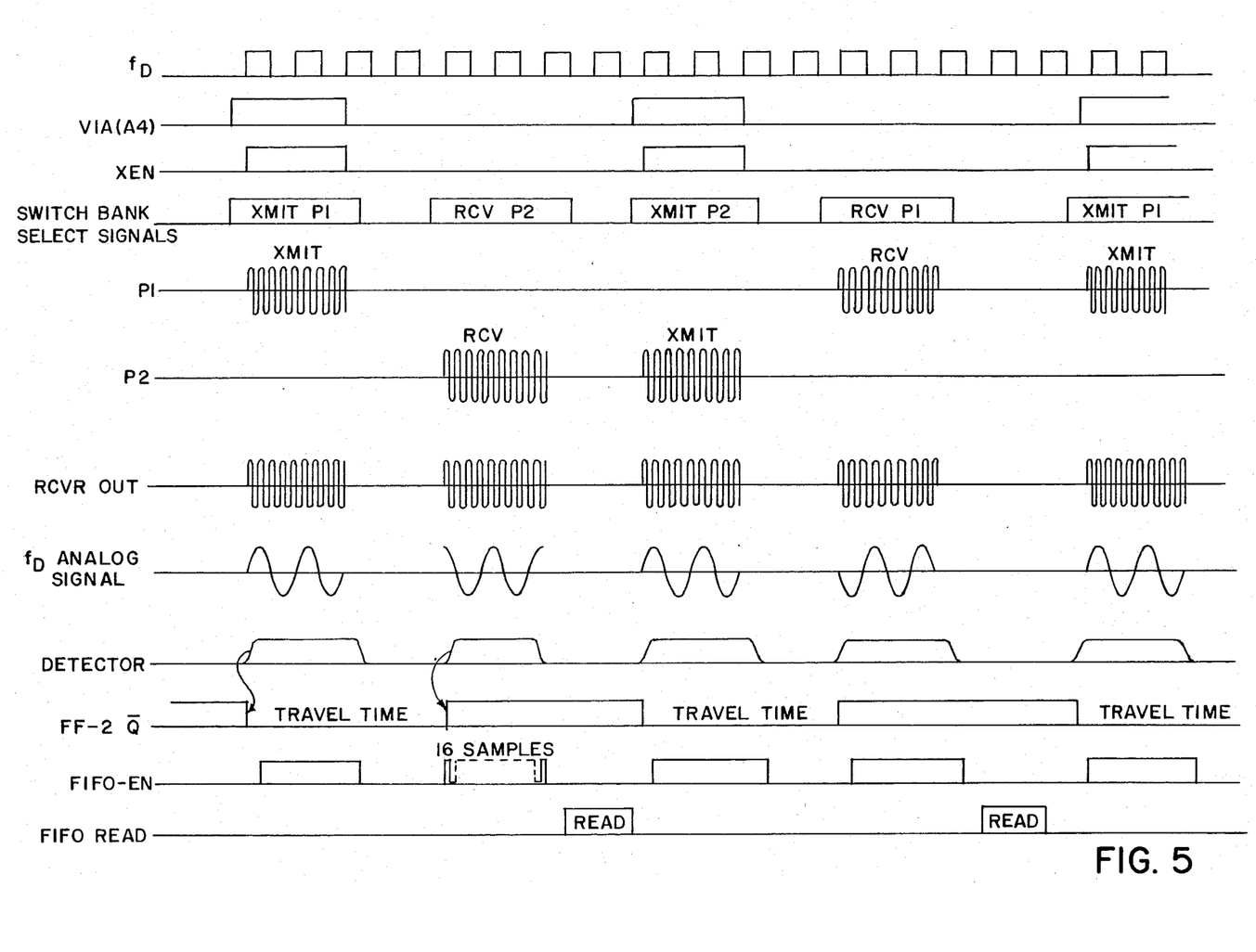
FIG. 5 is a graphical illustration of some of the signals that are processed by the circuit of FIGS. 1-4 as functions of time.

The switching of the flip-flop FF-1 is synchronized to the difference frequency signal $f_D$ represented in FIG. 5, which in this example is a frequency of 95 kHz. This signal is coupled to the clock input (C) on the flip-flop FF-1 from a circuit 19 that generates various timing signals, including the difference frequency signal. After the instruction has been executed to remove the reset signal from the R input, the next rising edge of the clock signal will set the Q output of the flip-flop FF-1 to a logic high state and enable the transmitter 14 through the XEN input. When the transmitter 14 is to be turned off, the microcomputer 16 executes another instruction to reset the flip-flop FF-1 by switching the output from pin A4 on the VIA to a logic low state. Thus, a gating pulse XEN is seen in FIG. 5 which defines the number of cycles in each XMIT pulse train.

After the train of pulses has been transmitted to one of the probes, and has been received by the other, it is routed back through the FET switch bank 15 to a block of circuitry 20 in FIG. 1 that includes a signal receiver, a mixer and a signal detector. The received (RCV) signal is illustrated in FIG. 5 as a train of pulses similar to the XMIT signal. From this RCV signal, the circuitry 20 extracts an analog signal of frequency $f_D$ seen in FIG. 5. This signal is fed to a very fast analog-to-digital converter 21 seen in FIG. 1, which is further described in the Component Appendix and which is capable of conversions at a rate up to 15 MHz. The A-to-D converter 21 receives clock signals at its C input at a frequency of $8(f_D)$ or 760 kHz so that eight conversions are made during each cycle of the signal being received from the receiver/mixer/detector circuitry 20. The digitized values are then conveyed as data to a digital wave memory 22 which takes a snapshot of the analog signal at eight different times during one cycle. This memory 22 is comprised of three first-in-first-out (FIFO) memory circuits seen in FIG. 3.

Figure 6:
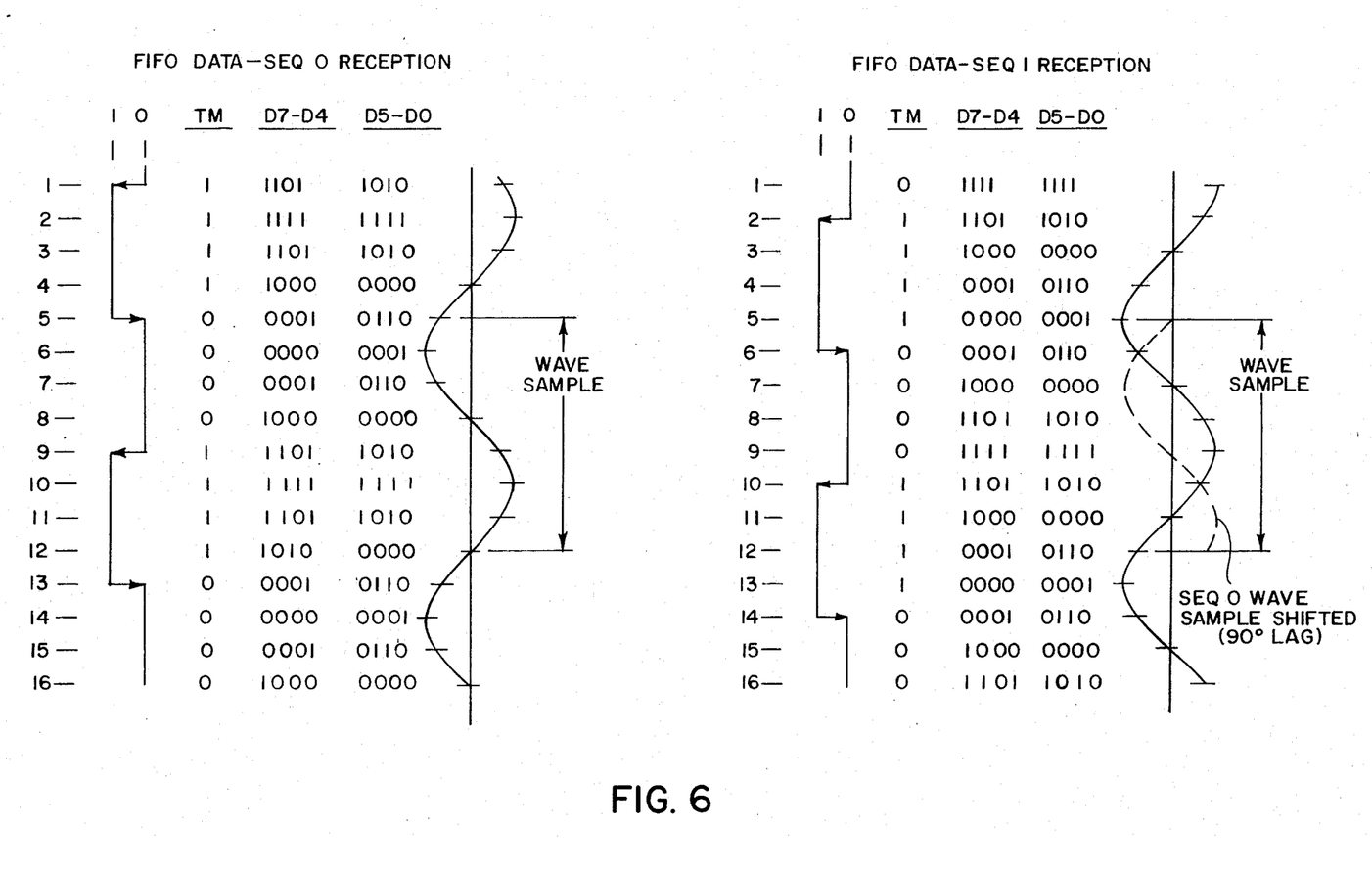
FIG. 6 is a graphical illustration of the signals that are stored as data in the wave memory of FIG. 1.

As seen in FIG. 1, the memory 22 is enabled at an enable (EN) input by a signal from a pair of NAND gates 23. The NAND gates 23 in turn are enabled by a signal from the receiver/mixer/detector circuitry 20 when the pulse train has been transmitted and received through the switch bank 15. To synchronize the storage of converted digital values, the NAND gates are clocked by the same signal of frequency $8f_D$ that is used to clock the A-to-D converter 21. As shown in FIG. 6, the FIFO's receive and store sixteen samples in succession, over two cycles of the analog signal of frequency $f_D$. The FIFO's each have storage for sixteen bytes of data.

In measuring flow rate, a first pulse train is transmitted from PROBE 1 to PROBE 2 in FIG. 1 and a second analog signal of frequency $f_D$ seen in FIG. 5 is extracted and sampled. The resulting data is then read into the microcomputer 16 before transmission in the opposite direction. A second pulse train is then sent in the opposite direction, from PROBE 2 to PROBE 1, and a fourth analog signal of frequency $f_D$ seen in FIG. 5 is extracted and sampled and the data is stored in the memory 22. (The first and third analog signals of $f_D$ seen in FIG. 5 are signals detected to confirm transmission, while the second and fourth signals are those extracted from the RCV signals.) The microcomputer 16 reads the data before the next transmission by transmitting FIFO READ control signals on the control bus 24 seen in FIG. 1. The time interval for the "read" operation is shown in FIG. 5.

The analog signals are sampled and compared to detect a difference in phase angle corresponding to the effect of the fluid flow on the respective travel times. The receiver/detector circuit 20 may exhibit timing instability or drift due to the effects of temperature and electrical noise. If this occurs, there could be a delay in the response of the detector that is variable from one reception to the next. To enable the signal processing circuit 10 to operate independent of such conditions a reference is provided. This reference is the clock signal of frequency $f_D$ seen in FIG. 5 which is generated by the timing signal circuit 19 and which is transmitted to one data input on the wave memory 22. This signal provides individual "timing marks", each of which is stored with a respective eight-bit value of the analog signal of frequency $f_D$ that has been converted by the A-to-D converter 21. When the data is read by the microcomputer 16, it also reads the timing marks. It then uses the timing marks to "shift" or align the two digitized waveforms for a correct comparison of phase difference based on a common reference—the timing marks.

Although the sampled analog signal and the reference clock signal in the preferred embodiment are of frequency $f_D$ as a result of the signal mixing process described above, other embodiments may sample a higher frequency signal such as the carrier frequency signal, using a high frequency clock signal that samples succeeding cycles at different points. These embodiments are also contemplated as being within the scope of the invention, but these embodiments are not preferred, because the sampling of such higher frequency signals makes the signal processing circuit more susceptible to the adverse effects of electrical noise.

Besides determining a phase difference between signals transmitted and received in opposite directions, the actual travel times from transmission to reception, $T_{12}$ and $T_{21}$, are also monitored to provide the quantities for the denominator of equation (9) above. The travel times are accumulated in the first instance by a high resolution counter 25 in FIG. 1 which is enabled at a CEN input when the transmission of a signal is confirmed by a flip-flop FF-2.

The flip-flop receives a logic high signal at its D input at the same time that the reset is removed from flip-flop FF-1. A clock signal is provided at the C input on the flip-flop FF-2 by a leakage current signal fed from the switch bank 15 to the receiver/mixer/detector 20 as a transmission signal is transmitted to one of the probes. This signal is detected and coupled to the clock input (C) to generate a logic low enabling signal at the ~Q output, which will enable the counter 25. The logic signal from the ~Q output is shown in FIG. 5. The counter 25 receives clock signals at a frequency of $8k(f_D)$ or 10.24 MHz at its clock (C) input. Since this is eight times the frequency of the carrier, $k(f_D)$, the counter can resolve one-eighth cycle of the carrier wave.

Figure 3:
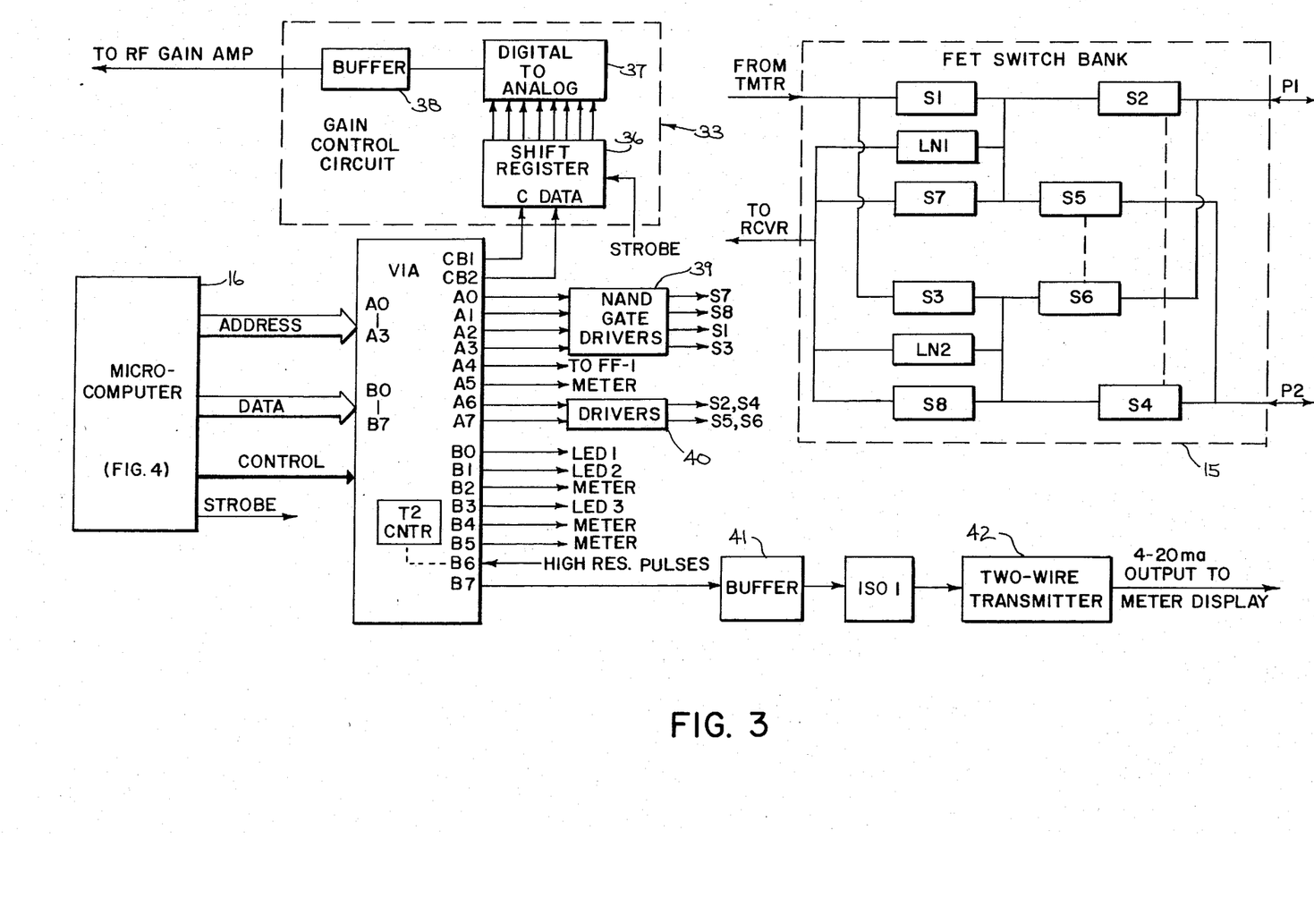
FIG. 3 is a schematic diagram showing details of the VIA circuit and the FET switch bank shown in FIG. 1.

The counter 25 is an eight-bit binary counter that accumulates 256 counts, and on the last count turns over to zero. When this occurs, a signal is transmitted from an RC0 (reset-counter-to-zero) output to an input B6 in I/O Port B of the VIA. Input B6 is connected to a low-byte portion of a T2 counter in the VIA as seen in FIG. 3. Thus, each time the high resolution counter 25 turns over to zero, the T2 counter counts one at an effective frequency of 10.24 MHz/256 or 40 kHz. The high resolution counter 25 and the T2 counter act as the low byte and high byte, respectively, of a 16-byte counter that counts pulses at a frequency of 10.24 MHz.

At the end of a transmission, the signal to the D input of the flip-flop FF-2 switches to a logic low with the reassertion of the reset signal to the flip-flop FF-1. When the next RCV signal is detected as represented by the DETECTOR signal in FIG. 5, a clock signal to the flip-flop FF-2 resets the ~Q output to a logic high state to terminate accumulation of time by the counter 25 and the VIA T2 counter. The travel time is thus defined by the switching of the ~Q output of the flip-flop FF-2 as seen in FIG. 5. During this time the FIFO's are enabled (FIFO EN) to receive sixteen data samples as shown in FIG. 5. The microcomputer 16 allows a certain time for reception to occur and then reads the travel time (FIFO READ in FIG. 5) from the VIA counter and the counter 25, using the control bus 24 to signal the counter 25 to couple its data to the data bus 17.

Figure 4:
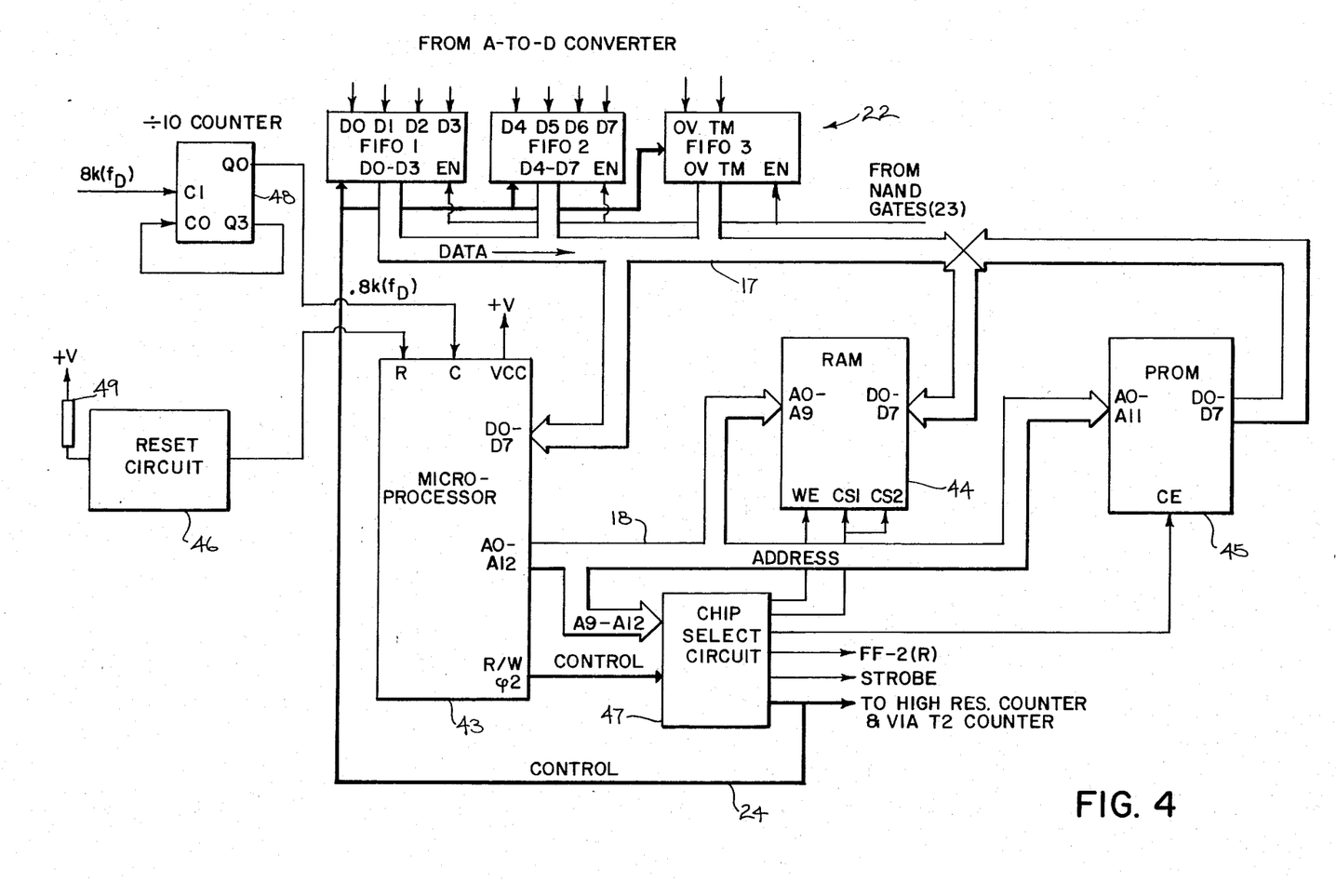
FIG. 4 is a detail schematic diagram of the microcomputer of FIG. 1.

The circuit elements of FIG. 1 shall now be examined in more detail as illustrated in FIGS. 2–4. FIG. 2 shows the circuit 19 for generating digital timing signals of frequency $f_D$ and $8(f_D)$, as well as for generating signals used in mixing the transmission and reception signals to obtain signals at the difference frequency $f_D$. This circuit 19 includes an OSCILLATOR 2 circuit similar to the OSCILLATOR 1 circuit, except for the frequency of the crystal oscillator, which is selected to generate a digital pulse train at a frequency of $8(k+1)f_D$.

The outputs of the OSCILLATOR 1 and OSCILLATOR 2 circuits are coupled to the inputs of a mixer 26, which in this embodiment is an ex-OR gate. When the inputs to the mixer 26 are at different logic states, the rising edge of a pulse will be generated at its output. When the inputs become the same again, the falling edge of the pulse will be generated. The pulses will therefore be generated at about twice the frequency of either input, but the pulses will be of varying pulse width. This signal will contain components representing the sum and the difference of the two input signals. By coupling this composite signal through a low pass filter and square wave generator circuit 27, a digital signal of frequency $8(f_D)$ is produced. To obtain a signal at the difference frequency $f_D$, the output of the circuit 27 is coupled to a clock input C on a counter 28 to generate an output signal at its Q3 output at one-eighth the frequency of the clock input. This signal is used to clock the flip-flop FF-1 and to generate the timing marks to the digital wave memory in FIG. 1.

Still referring to FIG. 2, the signal from the OSCILLATOR 2 circuit is also coupled to a clock input C on another divide-by-eight counter 29. This produces a digital signal of frequency $(k+1)f_D$ that is coupled to a mixer 30 for mixing with the reception signal. To mix the analog reception signal with the digital signal, a linear amplifier is used as the mixing circuit 30, and the digital input is coupled to a gain control input on the amplifier. The digital signal turns the amplifier on and off at the frequency $(k+1)f_D$. The output of the mixer 30 is therefore a chopped version of the reception signal that includes both the sum of the frequencies of the two mixer inputs, and the difference of the frequencies of the two mixer inputs. The mixer output signal is coupled to the input of a low pass filter 31 to filter out the sum frequency signal, and allow only an analog signal of frequency $f_D$ to pass to the analog input of the A-to-D converter 21 in FIG. 1.

Also seen in FIG. 2 are other details of the receiver/detector/mixer circuitry 20. The reception signal is routed from the switch bank 15 in FIG. 1 to an RF (radio-frequency) gain amplifier 32. The gain of this amplifier 32 is controlled from the microcomputer 16 through a gain control circuit 33, which will be described in more detail below in relation to FIG. 3. The output of the amplifier is sent to the input of a presence detector 34, which converts a radio frequency signal in a certain frequency range to a DC signal. Such a circuit is also known as a coherent detector. The output of the presence detector 34 is connected to the input of a threshold detector 35 for detecting a reception signal of suitable magnitude for conversion and storage. It is the output from this presence detector that clocks the flip-flop FF-2 and enables the NAND gates 23 in FIG. 1.

FIG. 3 shows how the microcomputer 16 interfaces to the gain control circuit 33 and to the FET switch bank 15, as well as the details of those two circuits 15 and 33. The microcomputer 16 transmits control information to the VIA, which uses outputs CB1 and CB2 as a serial output port. Serial clock signals are transmitted from output CB1 to a clock input C on a shift register 36. Data signals are transmitted from output CB2 to a DATA input on the shift register 36. When a byte of data has been transferred, a STROBE signal is sent to the shift register 36 from the microcomputer 16 to transfer the data to an output latch included in the shift register circuit 36. The outputs of the shift register are always enabled, so the data will then be coupled to the inputs of a digital-to-analog converter 37. The output of this circuit 37 is a DC signal, which is coupled through a voltage following amplifier that serves as a signal buffer 38. The output of this buffer 38 becomes the input to the RF gain amplifier 32 in FIG. 2.

Also seen in FIG. 3 are the details of the FET switch bank 15. Each of the switches S1–S8 includes a pair of field effect transistors and a protective diode. The switches S1–S8 have control inputs (not shown) by which they are switched on (closed) and off (open). The signals to these control inputs are the outputs from the NAND gate drivers 39 and voltage following drivers 40. The output from the NAND gate driver 39 labeled S7, for example, controls the switching of switch S7. The microcomputer 16 turns individual switches in the switch bank 15 on and off by transmitting control data to the VIA. This data appears at outputs A0–A7 in I/O port "A" of the VIA.

Some of the switches S1–S8 operate in tandem. Switch S2 is always switched to the same on or off state as switch S4. Similarly, switches S5 and S6 are operated together.

The signal from the transmitter 14 is coupled along one signal path through switches S1 and S2 to output P1, assuming that both of these switches are closed. This signal can also be coupled through switches S3 and S6 to output P1. If it is desired to route the transmission signal to output P2, this can be accomplished by closing switches S1 and S5, or by closing the combination of switches S3 and S4.

A signal received at output P1 can be routed to the receiver circuitry by closing switches S2 and S7 or by closing switches S6 and S8. A signal received at output P2 can be routed to the receiver circuitry by closing switches S4 and S8, or by closing switches S5 and S7.

Also included in the switch bank 15 are two leakage networks LN1 and LN2. When a signal is transmitted to output P1 by closing switches S1 and S2, the leakage network LN1 provides a path for current to the receiver circuitry 20. This current produces the clock signal to the flip-flop FF-2 in FIG. 1 to signal the start of one of the travel times $T_{12}$. Similarly, the leakage network LN2 will leak current to the receiver to signal the start of travel time $T_{21}$ when the transmission is routed through switches S3 and S4 to output P2. It should now be apparent how the microcomputer 16 controls the switch bank 15 from the outputs of the VIA and how confirmation signals are provided for each transmission signal by leakage through the switch bank 15 into the receiver.

The VIA has a second I/O port with terminals B0–B5 and B7 used as outputs and terminal B6 used as an input. Terminal B6 receives signals from the high resolution counter 25 as discussed above. Terminal B7 conveys an output signal from the microcomputer 16 at a signal frequency that is proportional to the flow rate calculated by the microcomputer 16. This signal is coupled through a buffer 41 to an isolation circuit ISO 1 which is also a frequency-to-voltage converter. The resulting DC voltage signal is fed to a two-wire transmitter 42. The output from this transmitter 42 is a DC signal in the range of 4–20 milliamps, which corresponds to the range of flow rate from zero flow to a full-scale flow for the flow meter. Other outputs from the VIA are used to send signals to various other portions of the meter display or other type of meter output, and these have been labeled with the term "meter" in FIG. 3. Still other VIA outputs control LED's 1–3 which are used as status indicators. Lastly, it should be noted that output A4 transmits a signal to the flip-flop FF-1 as discussed above.

Thus far the microcomputer 16 has been considered a single entity. In this example of the invention, the microcomputer 16 can be further described in terms of a microprocessor 43 seen in FIG. 4 with external memories 44 and 45. Also included in the microcomputer 16 are (1) a reset circuit 46, and (2) a chip select circuit 47 for generating control signals to other hardware in the signal processing circuit 10 of FIG. 1. Besides those circuits making up the microcomputer 16, FIG. 4 also shows a dual binary counter 48 and the details of the FIFO's.

The microprocessor 43 in this example is the R6504 CPU available from Rockwell International. This processor generates addresses from outputs A0–A12. Ten of these outputs A0–A9 are connected to corresponding inputs on a scratchpad random access memory (RAM) 44, and twelve of these outputs A0–A11 are connected to corresponding inputs on a programmable read-only memory (PROM) 45. The RAM 44 stores data that is stored and recalled by the microprocessor 43 as it executes a program of instructions stored in the PROM 45. Because the PROM 45 is encoded with these instructions in a way that is not usually changed without replacing the circuits constituting the PROM 45, the encoded instructions are referred to as "firmware". In this example, the PROM 45 is provided by a single memory circuit for storing 4k bytes of program information.

The RAM and the PROM are enabled through the chip select circuit 47 which receives and decodes signals from address outputs A9–A12 to generate signals to the CS1 and CS2 enable inputs of the RAM and to the CE enable input on the PROM. A read/write (R/W) control signal is coupled to the chip select circuit 47 to control the state of the signal to the WE data direction input on the RAM. Data is read from and written to the RAM over lines D0–D7 of a byte-wide data bus 17 connecting corresponding terminals on the RAM and the microprocessor 43. The data bus 17 also connects to terminals D0–D7 on the PROM.

The chip select circuit 47 also decodes address signals to read accumulated values from the VIA T2 counter and the transmission time counter 25 and to reset the counter to zero. Another address is decoded to strobe data to the outputs of the shift register 36 in the gain control circuit 33 seen earlier in FIG. 3. And other addresses are decoded to read data or clear the FIFO's 1–3 through control lines going to those circuits as seen in FIG. 4. The FIFO's are enabled by a signal to their EN enable inputs, and this signal is provided from the NAND gates 23, as discussed in the description of FIG. 1.

The first and second FIFO's each receive four bits of data from the A-to-D converter 21, while the third FIFO receives an overflow (OV) bit and a timing mark (TM) for each conversion. Bits D0–D3 are handled by FIFO1, bits D4–D7 are handled by FIFO 2, and the OV and TM bits are handled by FIFO 3. This results in each FIFO having a four-bit nibble of data to be read by the microprocessor 43. The two data nibbles are read from FIFO 1 and FIFO 2 in one read operation, and the third nibble is read as part of a second read operation.

FIG. 4 also shows several other details related to the microprocessor 43. A clock signal for the microprocessor 43 is derived from the OSCILLATOR 1 circuit in FIG. 2 and divided by ten through a decade counter 48. This counter 48 receives the signal at the frequency $8k(f_D)$ at one clock input C1, which is the input for the divide-by-five portion of the counter 48. When the first counter section has counted to five, it generates a signal from its Q3 output that is coupled back to a second clock input CO, which is the input for the divide-by-two portion of the counter 48. The Q0 output of this counter section is connected to the clock (C) input on the microprocessor 43 to provide clock signals at $0.8k(f_D)$ or 1.024 MHz.

The reset circuit 46 is one of many known, suitable circuits for providing the reset signal at the R input on the microprocessor 43 when power is first applied. The reset circuit 46 is connected to the power supply +V through a pull-up resistor 49. The power supply is also connected to a VCC input on the microprocessor 43. For further information on interfacing the R6504 CPU and the R6522 VIA to external circuitry, reference is made to the R6500 Microcomputer System Hardware Manual, which is available from Rockwell International, Anaheim, Calif. For further information on the other circuitry, reference is made to Appendix A and the commercial literature available from the respective vendors listed therein.

The remaining portion of the description concerns the program of instructions that are stored in the PROM 45 and read and executed by the micrprocessor 43 to direct the sequencing of the signals that have been discussed above. These instructions are organized in routines that are listed in Appendix B at pages 6–47. For interpretation of individual instructions, reference is made to the R6500 Microcomputer System Manual available from Rockwell International. Also included in Appendix B at pages 1 and 2 are definitions of the VIA port lines, a map of an ERROR byte stored in the RAM 44 and notes regarding a SEQUENCE word to be discussed below. At pages 4 and 5 of the Appendix are the addresses for the other variables stored in the RAM and the addresses at which the microprocessor 43 communicates with other circuits in the overall signal processing circuit 10. At page 47 of the Appendix is a list of constants that are stored in the PROM at addresses following the instructions for the microprocessor 43.

The circuitry which has been described is capable of generating multiple signal transmission sequences for different pairs of probes in a system with more than one pair of probes. In its broadest application, the invention requires only one pair of probes and two signal transmission sequences, and therefore the discussion of the program will be directed to such a system. For one pair of probes, a first transmission is sent from the upstream probe (PROBE 1 in FIG. 1) to the downstream probe (PROBE 2 in FIG. 1), and a second transmission is sent in the opposite direction (from PROBE 1 to PROBE 2 in FIG. 1). To carry out this operation a data variable referred to as the SEQUENCE word is stored at location 0082(hex) in the RAM 44. This byte is binary coded in its two least significant bits as shown in Table 1 to select either the downstream or upstream direction for transmission of the ultrasonic signal.

TABLE 1

| BIT | 7 | 6 | 5 | 4 | 3 | 2 | 1 | 0 |
|---|---|---|---|---|---|---|---|---|
| FUNCTION | X | X | X | P2 | P1 | P0 | B1 | B0 | where:

X = Not Used

P2, P1 and P0 constitute a three-bit binary defining the number of probe pairs minus 1, and B1 and B0 constitute a two-bit binary number defining a program sequence, and in the case of SEQUENCE 0 and SEQUENCE 1 also define the setting of switches in the switch bank 15 to control the routing of a transmission signal to one of the probes and the routing of a reception signal from one of the probes.

The program provides instructions to read the above SEQUENCE word and to connect the probes to the alternate signal paths through the switch bank 15. The program provide further instructions to change the settings of the switch bank for transmission and reception, respectively. The SEQUENCE bits B1 and B0, the selected PROBE, the mode of transmission or reception, and the setting of the switches S1–S8 are correlated in Table 2 below. Also shown are FIFO states in which the FIFO's are receiving either wave data extracted from a signal sent downstream (FIFO DN) or wave data extracted from a signal sent upstream (FIFO UP) in the pipe 11.

TABLE 2

| SEQ. NO. | PROBE | MODE | S1 | S2 | S3 | S4 | S5 | S6 | S7 | S8 | DN | UP |
|---|---|---|---|---|---|---|---|---|---|---|---|---|
| 0 | 1 | XMIT | 1 | 1 | 0 | 1 | 0 | 0 | 0 | 0 | | |
| 0 | 2 | RCV | 0 | 1 | 0 | 1 | 0 | 0 | 0 | 1 | X | |
| 1 | 2 | XMIT | 0 | 1 | 1 | 1 | 0 | 0 | 0 | 0 | | |
| 1 | 1 | RCV | 0 | 1 | 0 | 1 | 0 | 0 | 1 | 0 | | X |

Referring to FIG. 5 and the above Table 2, it will be seen that during XMIT portion of SEQUENCE 0 the switch bank 15 is enabled for transmission through terminal P1 and PROBE 1. During the RCV portion of SEQUENCE 0, the switch bank is enabled for reception through PROBE 2 and terminal P2. In SEQUENCE 1, the switch bank 15 is enabled for transmission through terminal P2 and PROBE 2 and reception through PROBE 1 and terminal P1.

Figure 7:
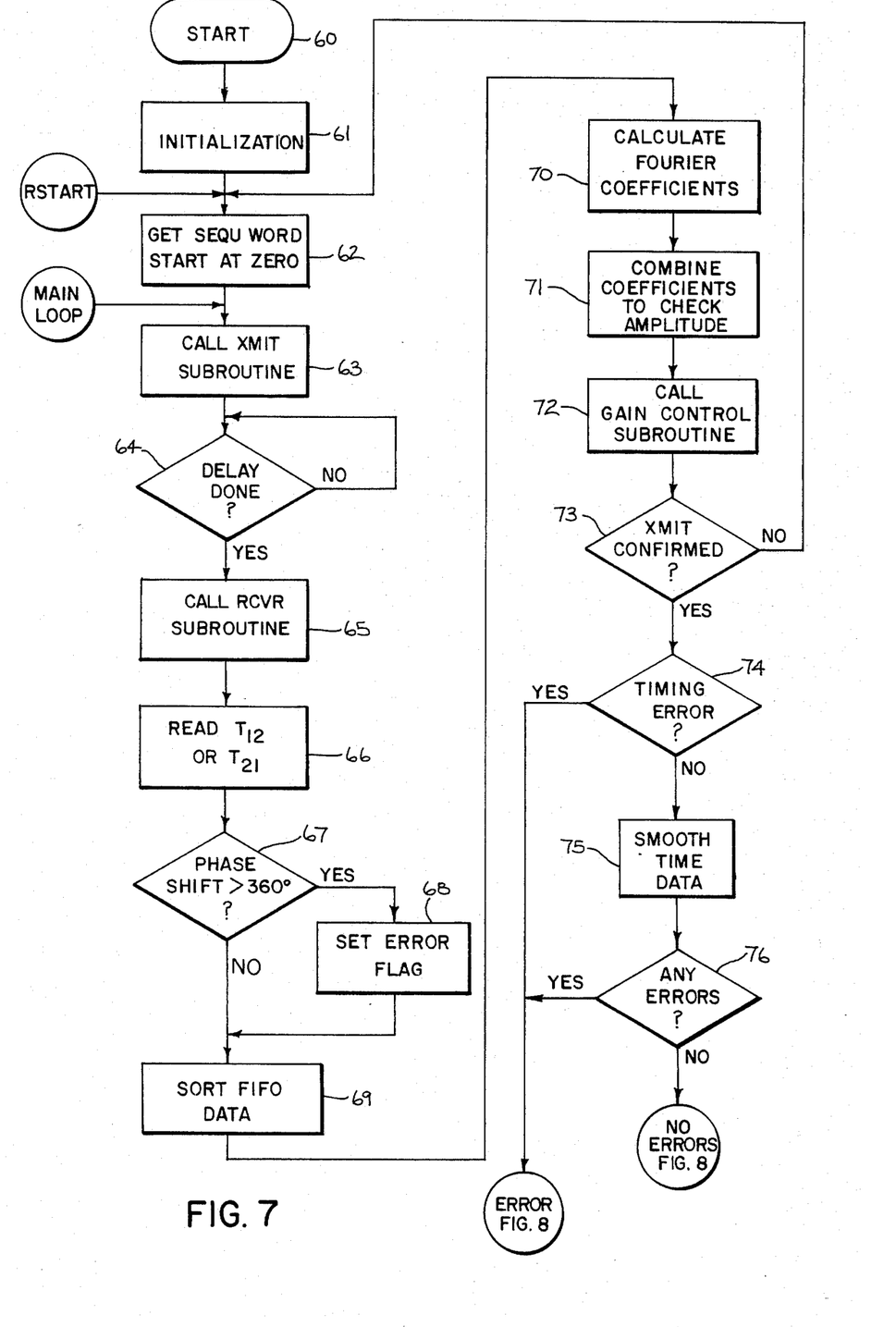
FIGS. 7 and 8 provide a flow chart of the program executed by the microprocessor of FIG. 4.
Figure 8:
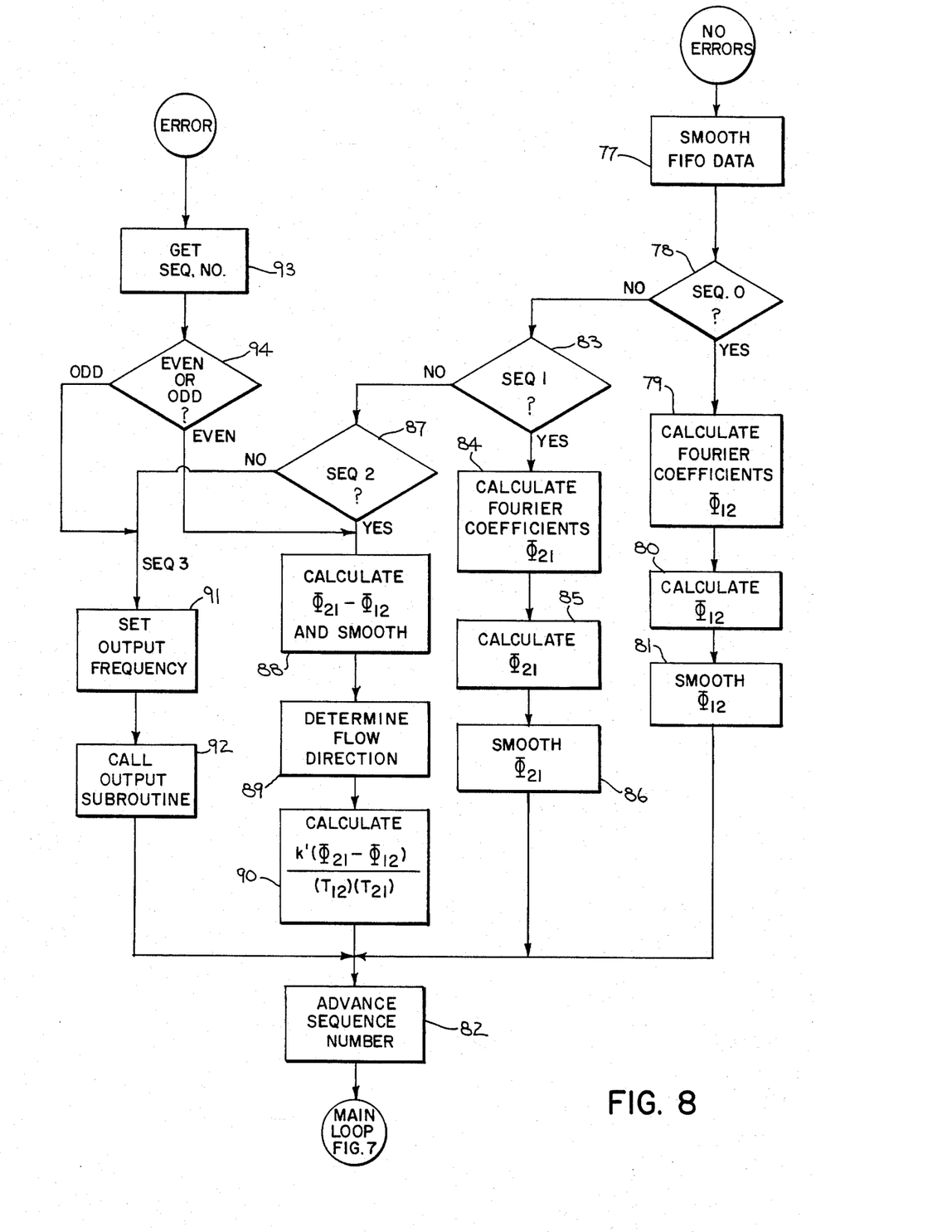

FIGS. 7 and 8 provide an overview of the organization and sequencing of the program instructions listed in Appendix B. The program is organized in a MAIN LOOP sequence with a series of calls to subroutines of instructions that perform the detailed circuit functions. The flow chart in FIGS. 7 and 8 parallels the MAIN LOOP except that several of the subroutines are described in relation to more than one program block to emphasize key points in the flow of the program.

Referring to FIG. 7, the start of the program is represented by a start block 60. An INITIALIZATION subroutine represented by process block 61 is executed to select functions for the I/O ports of the VIA, to set initial values of gain for the gain control circuit 33, and to initialize the counters in the VIA. A pointer is set to a location in memory where data will be received from the FIFO's. Next, as represented by process block 62, the SEQUENCE variable is provided with an initial value of zero to signal a transmission sequence according to the data in the first line of Table 2 above. Block 62 also represents a RSTART re-entry point where the program will return under certain conditions to be discussed below.

Process block 63 represents the execution of the first operational subroutine, which is XMIT subroutine. First, the gain for the receiver is fetched and sent out to the VIA to control the signal amplification of the RF gain amplifier 32. Then the FIFO's and the travel time counters are reset to zero. The T2 counter in the VIA is initialized to count down from zero during the transmission. Control data is then sent to the VIA to enable the switch bank 15 through I/O port A according to the first line in Table 2 above.

Before sending out the transmission pulse train, a time-out counter is set up to count the number of times that the microprocessor 43 can look for a signal leaked back through the receiver to confirm the transmission. This signal is detected by determining that the high resolution counter 25 has started counting and has reached a certain number of counts. (Remember that the high resolution counter 25 only starts counting when flip-flop FF-2 is set by the confirm signal.)

The microprocessor 43 then starts the transmitter 14 by loading the appropriate data in the VIA to set the flip-flop FF-1 and enable the transmitter 14 at its XEN input. Assuming that the confirm signal has been received and the high resolution counter 25 has started counting, the microprocessor 43 will detect the count and then load the appropriate data in the VIA to reset the flip-flop FF-1 and disable the transmitter at its XEN input. Finally, other instructions are executed to load further data into the VIA to open-circuit all of the switches in the switch bank 15.

Referring to decision block 64, the MAIN LOOP includes several instructions after the return from the XMIT subroutine to provide a delay before the receiver (RCVR) subroutine can be called. The effect of this is seen in FIG. 5, where the switch bank select signals are off for a time between transmissions (XMIT's) and receptions (RCV's). This allows any delayed signals in the receiver to dissipate before measurement of the reception signal is attempted. This delay is provided by checking the T2 counter in the VIA to see if it has counted down to a certain predetermined constant. Assuming that it has, the delay is complete (represented by the YES branch from block 64 in FIG. 7) and the sequence proceeds to the RCVR subroutine represented by process block 65.

The first function during the RCVR subroutine is the output of appropriate data to the VIA to set the switches in the switch bank to the states in the second line of Table 2 above. The reception signal is detected by circuitry, notably the flip-flop FF-2, so the microprocessor 43 executes a timing sequence corresponding to the longest expected travel time, and at the end of this sequence, disables the switch bank 15 and resets the flip-flop FF-2.

After disabling the receiver, the microprocessor 43 executes a TLS590 subroutine represented by blocks 66-68 in FIG. 7. First, as represented by process block 66, the microprocessor 43 reads the travel time, $T_{12}$ or $T_{21}$, depending on which sequence, SEQ 0 or SEQ 1, is being executed. This involves reading the accumulated count from the high resolution counter 25 and the count from the VIA T2 counter. Since the T2 counter has been counting down, its count must be complemented to find the actual number of counts. The combined sixteen-bit count is then compared with high and low limits to see whether the travel time was outside the range in which the ultrasonic signal is shifted 360° or less. This test is represented by decision block 67. If the answer is YES, an error bit referred to as a "flag" is set in an ERROR byte stored in the RAM 44, and this is represented by process block 68.

The microprocessor 43 next processes the data stored in the FIFO's as the result of the transmission across the flow stream. Process block 69 in FIG. 7 represents the calling of an FIFOC8 subroutine to sort out the data that will be used to determine a phase difference.

FIG. 6 illustrates the type of data that is stored in the FIFO's. Each line of data contains one of the sixteen bytes sampled over two cycles of the $f_D$ sine wave analog signal. The set of data to the left is the result of executing the SEQUENCE 0 signal transmissions, while the data to the right is the result of executing the SEQUENCE 1 signal transmissions. Each line of data also includes a ninth bit constituting a timing mark (TM) and the group of timing marks provides a digital pulse waveform to the left of each set of data.

Extra data is collected in the FIFO's, so that the data at the beginning and the data at the end of each set can be discarded, and the most reliable data can be used in the phase determination. At the start of the FIFOC8 subroutine the first four samples are discarded. Then the first byte of data is stored at location 00C0(hex) in the RAM 44, and the timing mark and overflow flag are stored in the following location at 00C1(hex). The wave data and timing mark data is interleaved in this fashion so as to occupy sixteen bytes in memory from 00C0(hex) to 00CF(hex). The FIFO data is also loaded into another area of memory from 0029(hex) to 003F(hex) for processing in a "smoothing" operation to be explained below. The first table of data is then tested to determine if four samples with timing marks of "1" are stored in sequence. If not, their positions are adjusted to achieve this result. This has the same effect as cutting off a section of the wave in FIG. 6 and rotating it to the other end of the remaining portion of the wave. In this way the eight selected samples can be shifted so that the timing marks for each set of data are aligned, and a common reference can be provided for waves represented by the different sets of data. As shown in the right half of FIG. 6, the two wave samples are ninety degrees apart in phase, and this will be detected by executing the microprocessor program. Besides using the timing marks, the program also incorporates Fourier mathematical methods.

The wave data from the FIFO's is analyzed in two ways using Fourier mathematical methods. With these methods, the periodic signal of frequency $f_D$ that is received from the low pass filter 31 in FIG. 2 and shown in FIG. 6 can be analyzed to determine (1) its magnitude or largest instantaneous value and (2) its phase. A Fourier series can be expressed as follows:

$$f(t) = a_0 + a_1 \cos w_o t + a_2 \cos 2w_o t + \ldots + a_n \cos nw_o t \quad (10)$$

$$\ldots + b_1 \sin w_o t + \ldots + b_n \sin nw_o t + \ldots$$

The above series may also be expressed in a number of alternative ways, one of which is obtained by recognizing that for all n, $$a_n \cos nw_o t + b_n \sin nw_o t = c_n \cos (nw_o t + \Phi_n) \quad (11)$$

where:

$$c_n = \sqrt{a_n^2 + b_n^2} \text{ and } \Phi_n = \tan^{-1}\left(\frac{-b_n}{a_n}\right) \quad (12)$$

The coefficient $c_n$ is the amplitude and the term $\Phi_n$ is the phase of the nth harmonic. The term $\tan^{-1}$ is the inverse tangent and $\Phi_n$ is the angle with a tangent defined by the ratio of $-b_n/a_n$.

Referring to process block 70 in FIG. 7, the Fourier coefficients are first calculated to determine amplitude. To obtain the Fourier coefficients, the sine and cosine values for the various harmonics are stored as constants in the PROM 45. An FIFM subroutine is executed to multiply each of the eight samples from the FIFO's by the sine and cosine values for the fundmental frequency to obtain the $a_1$ and $b_1$ coefficients. These are each squared and the square is summed according to equation (12) to obtain the square of the $c_1$ coefficient. This process is carried out by executing an FIFOC2 subroutine represented by process block 71 in FIG. 7.

The microprocessor 43 next calls a GAIN CONTROL subroutine represented by process block 72. This routine compares the sum of the squares of the Fourier coefficients to certain predetermined constants to evaluate the strength of the signal being received through the RF gain amp 32. If the signal is too weak, certain gain control variables will be incremented, and when these are coupled to the gain control circuit, the gain will be increased. If the signal is too strong, the gain control variables are decremented and when these are coupled to the gain control circuit, the gain will be decreased. To prevent constant changing of the gain, a certain tolerance is programmed into the routine, so that minor adjustments will not be put into effect immediately.

Next, an ERROR HANDLER subroutine is called to perform the test represented by decision block 73 to determine whether there has been a confirmation signal confirming a transmission. This test is performed by examining the ERROR byte in which the flag bit is set in process block 68, although this is examination of a different bit. If the flag bit for no transmission confirmation is set, the microprocessor 43 returns to the RSTART entry point for the MAIN LOOP. If this bit is not set, the microprocessor 43 executes further instructions represented by decision block 74 to examine the bits that would have been set if a timing error was detected in block 67.

Assuming no timing errors are detected, the travel time data will be processed as represented by process block 75 in preparation for calculation of fluid flow later in the program. Process block 75 represents the execution of an SMOT subroutine in which the travel time data for $T_{12}$ and $T_{21}$ is transferred to a final location used by a calculation sequence. The travel time data is not merely transferred, but it is also blended with travel time data accumulated from previous transmission sequences according to a "smoothing" function. The actual smoothing calculation is performed by calling a further subroutine SMOA. Since this smoothing operation is applicable to other key data such as phase angle data and gain data, a short explanation will be made here.

If the accumulated value for the travel time $T_{12}$ were 0.5X, and in the next transmission sequence a value of 1.0X was detected, the accumulated value for $T_{12}$ would not be changed immediately to 1.0X. Instead, a portion of the change would be added to bring the accumulated value up to 0.75X, for example. On the next cycle through the program the accumulated value might be changed to 0.87X, and the accumulated value would be adjusted in succeeding cycles to approach 1.0X as an asymptope. In this way the smoothing function implements changes in a digital system over a number of cycles. The smoothing function is analagous to an RC circuit as it charges to the applied voltage over a period of time determined by the timing constant for the circuit.

After the travel time data has been "smoothed" into the designated memory locations, a check is made for other types of errors, as represented by decision block 76, these errors being of the type that would affect the integrity of the FIFO data. FIFO data is smoothed with accumulated FIFO data from previous transmissions as represented by process block 77.

Next, the microprocessor 43 fetches the SEQUENCE data word to determine the transmission sequence. As represented by decision block 78, it first checks for SEQUENCE 0. If this is the sequence being executed, a FIFM1 routine is called, as represented by process block 79, to calculate the Fourier coefficients for finding the phase angle $\Phi_{12}$ according to equation (12) above.

As represented by the next process block 80, the phase angle is actually calculated by calling a QUAD subroutine. The QUAD subroutine performs the inverse tangent calculation by dividing a circle into octants of 45° each and by shifting the angle to one of the quadrants where the range of values for the inverse tangent function are between zero and one. The magnitude of the inverse tangent function is then calculated and stored in memory. Next, as represented by process block 81, a smoothing function is applied to blend the most recent value of $\Phi_{12}$ with a history of values accumulated for that angle. After this operation, the microprocessor 43 increments the SEQUENCE number as represented by process block 82 and loops back to the MAIN LOOP entry point.

Returning to decision block 78, if a check of the SEQUENCE word for SEQUENCE 0 results in a negative answer, as represented by the "NO" branch, further instructions represented by decision block 83 are executed to check the SEQUENCE word for SEQUENCE 1. If SEQUENCE 1 is detected the Fourier coefficients for the angle $\Phi_{21}$ are calculated by executing a FIFM2 subroutine represented by process block 84. The QUAD subroutine is then called by calculate the angle $\Phi_{21}$ as represented by process block 85. This result is then "smoothed" into another location for $\Phi_{21}$ by calling a SMA1 smoothing subroutine represented by process block 86. The sequence then proceeds through process block 82 and loops back to the MAIN LOOP entry point as described above.

Returning to decision block 83, if neither SEQUENCE 0 nor SEQUENCE 1 are detected, further instructions in the MAIN LOOP are executed to test for the presence of bits for SEQUENCE 2 in the SEQUENCE word, as represented by decision block 87. If this sequence is detected, it implies that SEQUENCE 0 and SEQUENCE 1 have been executed and that data for $\Phi_{12}$ and $\Phi_{21}$ has been accumulated. Therefore, a DELA subroutine represented by process block 88 is called to calculate the difference between the phase angles, and the result is "smoothed" into a location in memory that will be accessed for the flow rate calculation. Next, a DIRECT subroutine represented by process block 89 is executed to determine the direction of flow in the pipe 11 and to set or clear a bit that will later be used in signaling the direction of the flow. Then, as shown by process block 90, the flow rate calculation is performed according to equation (9). This results in a number from zero to one that is a fraction of the full-scale flow.

The next time through the MAIN LOOP a program SEQUENCE 3 will be implied by the non-detection of numbers "00", "01" and "02" in executing the instructions represented by decision blocks 78, 83 and 87. Then a process block 91 will be executed to call a NORMAL 2 subroutine to determine a frequency for an output signal that is based on the fraction of full-scale flow calculated by executing process block 90. The result is stored as data that is accessible by an OUTPUT subroutine that is called next as represented by process block 92. By executing this routine, the microprocessor 43 sets up the VIA to generate an output signal from output B7 at the desired frequency. This frequency is then converted by the IS0 1 circuit in FIG. 3 to a DC signal that is transmitted by the two-wire transmitter 42 to the meter display. At the end of SEQUENCE 3, the program proceeds through process block 82 to turn over the sequence number to SEQUENCE 0 and return to MAIN LOOP re-entry point.

A further note covering the program is that if a timing error is detected in executing decision block 74 in FIG. 7, the sequence number is fetched as represented by process block 93 in FIG. 8, and examined as represented by decision block 94. If the error is detected during SEQUENCE 0, the program will execute SEQUENCE 2 before returning to the MAIN LOOP re-entry point. If the timing error is detected during SEQUENCE 1, the program will execute the SEQUENCE 3 blocks 91 and 92 before returning to the MAIN LOOP re-entry point.

Thus, it can be seen how the microprocessor 43 controls the signal processing circuit 10 by executing the program of instructions listed in Appendix B. The details of this description have been provided to describe a specific example, but those skilled in the art will recognize that these details may be varied while still practicing the basic concepts of the invention. Therefore, to distinguish that which has been given by way of example, from that which is basic to the invention, claims to the invention follow this description and the Appendices.

Appendix A

| Circuit Element | COMPONENTS Ref. Nr. | Description |
|---|---|---|
| Microprocessor | 43 | R6504P microprocessor manufactured by Rockwell International |
| RAM | 44 | Two UPD 444C 1K x 4-bit memories |

Appendix A-continued

COMPONENTS

| Circuit Element | Ref. Nr. | Description |
|---|---|---|
| PROM | 45 | manufactured by Texas Instruments One TMS 2732 4k x 8-bit programmable read-only memory manufactured by Texas Instruments, Inc. |
| Chip Select Circuit | 47 | One SN74LS138 3-to-8 line decoder manufactured by Texas Instruments, Inc., one MC14572 hex gate package manufactured by Motorola Semiconductor Products, Inc., and one SN7400N quad two-input NAND gates manufactured by Texas Instruments, Inc. |
| High Resolution Counter | 25 | SN74LS590 counter manufactured by Texas Instruments, Inc. |
| Analog-to-digital Converter | 21 | CA3308D A-to-D converter manufactured by RCA |
| FIFO's | FIFO 1, FIFO 2, FIFO 3 | Three CD40105BE sixteen-byte first-in-first-out manufactured by RCA |
| Counter | 48 | SN74LS390N dual decade counter manufactured by Texas Instruments, Inc. |
| Versatile Interface Adapter | VIA | R6522P Versatile Interface Adapter manufactured by Rockwell International |
| NAND Gates | 39 | One MC14088L quad two-input NAND gates manufactured by Motorola Semiconductor Products, Inc. |
| Drivers, Buffer | 38, 40 | One LM224 quad operational amplifiers manufactured by National Semiconductor Corporation |
| Buffer | 41 | One ULN2003A NPN Darlington transistor package manufactured by Sprague Electric Co. |
| Isolation circuit | ISO 1 | One TIL111 optical coupler circuit manufactured by Texas Instruments, Inc. |
| Shift Register | 36 | CD4094BE shift/store register manufactured by RCA |
| Digital-to-analog converter | 37 | R2R ladder circuit manufactured by Allen-Bradley Co. |
| RF Gain Amp | 32 | Five MC3340P operational amplifiers manufactured by Motorola Semiconductor Products, Inc. |
| Presence Detector | 34 | MC1330A1P multiplier circuit manufactured by Motorola Semiconductor Products, Inc., one of four CD4093BE two-input NAND gates manufactured by RCA |
| Threshhold Detector | 35 | Two of four CD4093BE two-input NAND gates manufactured by RCA |
| Mixer | 30 | MC3340P operational amplifier manufactured by Motorola Semiconductor Products, Inc. |
| Counter | 28 | MC14520BCP dual binary up counters manufactured by Motorola Semiconductor Products, Inc. |
| Counters | 13, 29 | SN74LS393 dual 4-bit binary counters manufactured by Texas Instruments, Inc. |
| Mixer | 26 | Three of four SN74LS136 quad two-input ex-OR gates manufactured by Texas Instruments, Inc. |
| Square Wave Generator | 27 | |
| Inverter | 50 | |
| Flip-flops | FF-1, FF-2 | CD4013BE dual D-type flip-flops manufactured by RCA |
| Oscillators | OSCILLATOR 1 OSCILLATOR 2 | Two crystal oscillators and one SN74LS04 hex inverters manufactured by Texas Instruments, Inc. |
| Transmitter | 14 | Includes one SN7400N quad two-input NAND gates and one of six SN74LS04N inverters manufactured by Texas Instruments, Inc. |
| FET switches | S1-S8 | Two 2N6660 field-effect transistors manufactured by Supertex and one 1N914A diode manufactured by Hewlett-Packard per switch |

I claim:

1. A method of generating a signal proportional to the rate of fluid flow in an axial direction through a pipe, the method comprising:

transmitting a first ultrasonic pulse train across the flow from a first probe to a second probe;

transmitting a second ultrasonic pulse train from the second probe to the first probe;

receiving the first and second ultrasonic pulse trains, generating a first sequence of multibit groups of sampling data for the first pulse train and generating a second sequence of multibit groups of sampling data for the second pulse train;

generating timing data, and associating the timing data in memory with the first and second sequences of sampling data to form first and second sequences of time-related sampling data;

reading time-related sampling data from memory and using the timing data therein as a reference for synchronizing the time-related sampling data;

using the synchronized data to determine phase difference between the respective ultrasonic pulse trains;

measuring the elapsed travel times between transmission and reception of the ultrasonic pulse trains; and in response to phase difference and the elapsed travel times, determining the flow rate and generating an output signal proportional thereto.

2. The method of claim 1, wherein generating the first sequence of multibit groups of sampling data is accomplished by performing a succession of conversions of a first analog signal and wherein generating the second sequence of multibit groups of sampling data is accomplished by performing a succession of conversions of a second analog signal.

3. The method of claim 1, wherein the first and second ultrasonic pulse trains are transmitted by the same transmitter.

4. The method of claim 1, further comprising:

routing the first and second ultrasonic pulse trains through a plurality of switches; and further comprising selectively operating the switches to route the first ultrasonic pulse trains from a transmitter to the first probe and to receive the first ultrasonic pulse train through the second probe, and to route the second ultrasonic pulse train from the same transmitter through the second probe and to receive the second ultrasonic pulse train through the first probe.

5. A flow meter signal processing circuit for connection to a pair of probes, each adapted to be positioned around the circumference of a pipe from the other, to measure the rate of fluid flow in an axial direction through the pipe, the signal processing circuit comprising:

signal generating means for generating a first ultrasonic pulse train to be transmitted through the pipe from a first one of the probes to a second one of the probes, and a second ultrasonic pulse train to be transmitted through the pipe from the second one of the probes to the first one of the probes;

signal receiving means for receiving the first and second ultrasonic pulse trains;

means for coupling the signal generating means and the signal receiving means to the probes;

first timing means coupled to the signal generating means and to the signal receiving means for generating elapsed time signals that mark the time from transmission to receipt of each ultrasonic pulse train;

sampling means coupled to the signal receiving means for generating and storing a first group of digital sampling data for the first ultrasonic pulse train and a second group of digital sampling data for the second ultrasonic pulse train;

second timing means coupled to the signal generating means and to the sampling means to generate timing data that are associated with the digital sampling data to allow synchronization of the first and second groups of digital sampling data; and digital processing means coupled to read the elapsed time signals from the first timing means and coupled to read and synchronize digital sampling data from the first and second groups of digital sampling data according to the associated timing data from the second timing means, the digital processing means being operable to determine flow rate in response to the elapsed time signals and in response to the synchronized digital sampling data, and the digital processing means being further responsive to generate an output signal proportional to flow rate.

6. The flow meter signal processing circuit of claim 5, wherein the sampling means includes an analog-to-digital converter and memory means coupled to receive and store a sequence of digital data samples from the analog-to-digital converter.

7. The flow meter signal processing circuit of claim 6, wherein the memory means includes at least two first-in-first-out memory circuits.

8. The flow meter signal processing circuit of claim 5, wherein:

the first and second ultrasonic pulse trains are transmitted from a single transmitting means and are received at a single receiving means; and wherein the means for coupling the signal generating means and the signal receiving means to the probes includes a plurality of switches that can be operated in different combinations to transmit and receive signals from either one of the two probes.

9. The flow meter signal processing circuit of claim 5, wherein the digital processing means is a microelectronic computer.

* * * * *